(12) United States Patent
Kishikawa et al.

(10) Patent No.: US 10,669,053 B2
(45) Date of Patent: Jun. 2, 2020

(54) MEASURING PACKAGING SYSTEM

(71) Applicant: Ishida Co., Ltd., Kyoto (JP)

(72) Inventors: Mikio Kishikawa, Ritto (JP); Yoshiki Horitani, Ritto (JP); Naomi Imaaki, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 294 days.

(21) Appl. No.: 15/550,446

(22) PCT Filed: Feb. 12, 2016

(86) PCT No.: PCT/JP2016/054183
§ 371 (c)(1),
(2) Date: Aug. 11, 2017

(87) PCT Pub. No.: WO2016/129688
PCT Pub. Date: Aug. 18, 2016

(65) Prior Publication Data
US 2018/0029734 A1 Feb. 1, 2018

(30) Foreign Application Priority Data
Feb. 12, 2015 (JP) ................................. 2015-025004

(51) Int. Cl.
*B65B 37/18* (2006.01)
*B65B 61/28* (2006.01)
(Continued)

(52) U.S. Cl.
CPC ................ *B65B 37/18* (2013.01); *B65B 9/20* (2013.01); *B65B 59/04* (2013.01); *B65B 61/28* (2013.01);
(Continued)

(58) Field of Classification Search
CPC .... G01G 19/393; G01G 19/387; B65B 61/28; B65B 9/20; B65B 37/18
(Continued)

(56) References Cited

U.S. PATENT DOCUMENTS 7,855,343 B2\* 12/2010 Nakagawa .............. B65B 37/18
177/25.18
2003/0000179 A1\* 1/2003 Nakagawa ............ B65B 9/2028
53/493

(Continued)

FOREIGN PATENT DOCUMENTS

| CN | 1697609 A | 11/2005 |
| CN | 203854869 U | 10/2014 |

(Continued)

OTHER PUBLICATIONS

Extended European Search Report issued by the European Patent Office dated Sep. 14, 2018, which corresponds to EP16749331.1-1016 and is related to U.S. Appl. No. 15/550,446.
(Continued)

*Primary Examiner* — Robert F Long
*Assistant Examiner* — Xavier A Madison
(74) *Attorney, Agent, or Firm* — Studebaker & Brackett PC

(57) ABSTRACT

A weighing and packaging system includes a combination weighing apparatus including a plurality of weighing units that accumulates and weighs supplied articles, a combination calculator that performs combination calculation using weighing values weighed by the weighing units and selects a combination of corresponding articles, and a collecting chute that collects and discharges the articles pertaining to the combination and a packaging apparatus including a former that receives the articles discharged from the combination weighing apparatus disposed on an upper side and
(Continued)

forms a belt-shaped package into a cylindrical shape such that the articles fill an inside thereof, a seal portion disposed below the former to seal the cylindrical package, thereby forming a bag, and a discharge portion that discharge the bag formed by the seal portion, wherein a first opening that opens to a lateral side of a discharge direction of the bag and exposes the collecting chute and the former on the lateral side is provided.

5 Claims, 8 Drawing Sheets

(51) Int. Cl.
*G01G 19/393* (2006.01)
*B65B 9/20* (2012.01)
*G01G 19/387* (2006.01)
*B65B 59/04* (2006.01)

(52) U.S. Cl.
CPC ......... *G01G 19/387* (2013.01); *G01G 19/393* (2013.01)

(58) Field of Classification Search
USPC .......................................................... 53/502
See application file for complete search history.

(56) References Cited

U.S. PATENT DOCUMENTS

| | | |
|---|---|---|
| 2003/0089421 A1 | 5/2003 | Hill |
| 2004/0134165 A1 | 7/2004 | Basque et al. |
| 2006/0156691 A1* | 7/2006 | Yokota .................... B65B 9/207 53/167 |
| 2009/0194558 A1* | 8/2009 | Nakagawa ................ B65B 3/26 221/282 |

FOREIGN PATENT DOCUMENTS

| | | |
|---|---|---|
| EP | 1197734 A1 | 4/2002 |
| EP | 1495967 A1 | 1/2005 |
| JP | 2000-203510 A | 7/2000 |
| JP | 2005-054659 A | 3/2005 |
| JP | 2007-022533 A | 2/2007 |
| JP | 2007-062806 A | 3/2007 |
| JP | 2008-245733 A | 10/2008 |
| WO | 2008/132942 A1 | 11/2008 |

OTHER PUBLICATIONS

Notification of Transmittal of Translation of the International Preliminary Report on Patentability (Chapter I) and Translation of Written Opinion of the International Searching Authority; PCT/JP2016/054183; dated Aug. 24 2017.

International Search Report issued in PCT/JP2016/054183; dated May 10, 2016.

An Office Action mailed by the State Intellectual Property Office of the People's Republic of China dated Sep. 26, 2018, which corresponds to Chinese Patent Application No. 201680009054.1 and is related to U.S. Appl. No. 15/550,446.

* cited by examiner

MEASURING PACKAGING SYSTEM

TECHNICAL FIELD

An aspect of the present invention relates to a weighing and packaging system including a packaging apparatus and a weighing apparatus loaded on the packaging apparatus.

BACKGROUND ART

Conventionally, Patent Literature 1 proposed a weighing and packaging system in which a weighing apparatus (for example, a combination weighing apparatus) is directly loaded on a packaging apparatus (for example, a vertical type bag-making packaging apparatus).

This device has advantages in that an installation place may be narrowed and an installation height may be lowered because the combination weighing apparatus is directly loaded on the vertical type bag-making packaging apparatus.

CITATION LIST

Patent Literature

Patent Literature 1: Japanese Unexamined Patent Publication No. 2000-203510

SUMMARY OF INVENTION

Technical Problem

In this system, food is targeted as an article to be weighed and packaged in many cases. When a weighing operation and a packaging operation are completed, a component with which the article comes into contact needs to be removed and cleaned.

In addition, when maintenance of the system is performed, various components are removed and maintenance is performed in some cases.

However, in the system described in Patent Literature 1, because a plurality of structures such as columns or beams are disposed, a component needs to be removed while avoiding the structures.

In addition, in a direction in which an inclination guiding plate 19 illustrated in the system of Patent Literature 1 discharges a bag, a conveyor for discharging the bag is present in many cases. For this reason, a component needs to be removed while avoiding a structure other than the weighing and packaging system as well, and there is a concern that workability may deteriorate.

An object of an aspect of the invention is to provide a weighing and packaging system capable of improving workability at the time of removing a component.

Solution to Problem

A weighing and packaging system according to a first viewpoint of the invention includes a combination weighing apparatus including a plurality of weighing units that accumulates and weighs supplied articles, a combination calculator that performs combination calculation using weighing values weighed by the weighing units and selects a combination of corresponding articles, and a collecting chute that collects and discharges the articles pertaining to the combination and a packaging apparatus including a former that receives the articles discharged from the combination weighing apparatus disposed on an upper side and forms a belt-shaped package into a cylindrical shape such that the articles fill an inside thereof, a seal portion disposed below the former to seal the cylindrical package, thereby forming a bag, and a discharge portion that discharge the bag formed by the seal portion, wherein a first opening that opens to a lateral side of a discharge direction of the bag and exposes the collecting chute and the former on the lateral side is provided.

Conventionally, the collecting chute or the former has been surrounded by a structure. For this reason, a removing direction or an installation space of the collecting chute or the former was restricted. In this weighing and packaging system, the first opening that opens to the lateral side of the discharge direction of the bag and exposes the collecting chute and the former on the lateral side is provided. For this reason, it is possible to easily remove the collecting chute or the former to the lateral side among components removed at the time of cleaning or maintenance.

In addition, in a so-called stacking type weighing and packaging system, the collecting chute and the former are arranged side by side in the vertical direction. In this weighing and packaging system, when the first opening that exposes the collecting chute and the former on the lateral side is provided, it is possible to provide the first opening having a size larger than or equal to that of a component to be removed. Therefore, a removal operation in a large space is allowed, and thus efficiency of the removal operation is improved.

Further, in this weighing and packaging system, the first opening opens to the lateral side of the discharge direction of the bag. Conventionally, a discharge conveyor is present in the discharge direction of the bag to be a structure obstructing a removal operation. In this weighing and packaging system, the first opening opens to the lateral side at which the discharge conveyor is not present, and thus a removal operation in a large space is allowed.

In a weighing and packaging system according to a second viewpoint of the invention, a second opening that opens to the discharge direction and exposes the collecting chute and the former on a discharge direction side may be further provided.

According to the second viewpoint of the invention, because the second opening that opens to the discharge direction of the bag and exposes the collecting chute and the former on a discharge direction side is provided, it is possible to perform operations from two directions of a lateral direction and the discharge direction in parallel. In addition, an operation direction may be selected depending on the circumstances. For this reason, efficiency of the removal operation is improved.

In a weighing and packaging system according to a third viewpoint of the invention, the first opening and the second opening may be continuous with each other.

According to the third viewpoint of the invention, because the first opening and the second opening are continuous with each other, a large opening is formed. For this reason, operations from the lateral side, the discharge direction, and a direction therebetween are allowed. In addition, because the first opening and the second opening are continuous with each other, a removal operation in a large space is allowed, and thus efficiency of the removal operation is improved.

A weighing and packaging system according to a fourth viewpoint of the invention may further include a main body frame supporting the weighing units, a plurality of first supporting legs disposed along a vertical direction to support the main body frame, a plurality of second supporting legs disposed along the vertical direction to support the former, and a plurality of horizontal beams connecting the plurality of first supporting legs to each other or the plurality of second supporting legs to each other, wherein the horizontal beams may not be disposed in the first opening.

According to the fourth viewpoint of the invention, rigidity of the weighing and packaging system is ensured by the horizontal beams provided between the first supporting legs or the second supporting legs disposed along the vertical direction. In addition, because the horizontal beams are not disposed in the first opening, the first opening widens. For this reason, efficiency of the removal operation is improved.

In a weighing and packaging system according to a fifth viewpoint of the invention, the respective first supporting legs may be supported by the second supporting legs.

According to the fifth viewpoint of the invention, because the respective first supporting legs are supported by the second supporting legs, a separate support member for supporting the weighing apparatus may not be provided. For this reason, an installation space may be narrowed. For this reason, a space for the removal operation may be widened, and efficiency of the removal operation is improved.

Advantageous Effects of Invention

According to an aspect of the invention, it is possible to provide a weighing and packaging system capable of improving workability at the time of removing a component.

DESCRIPTION OF EMBODIMENTS

Figure 1:
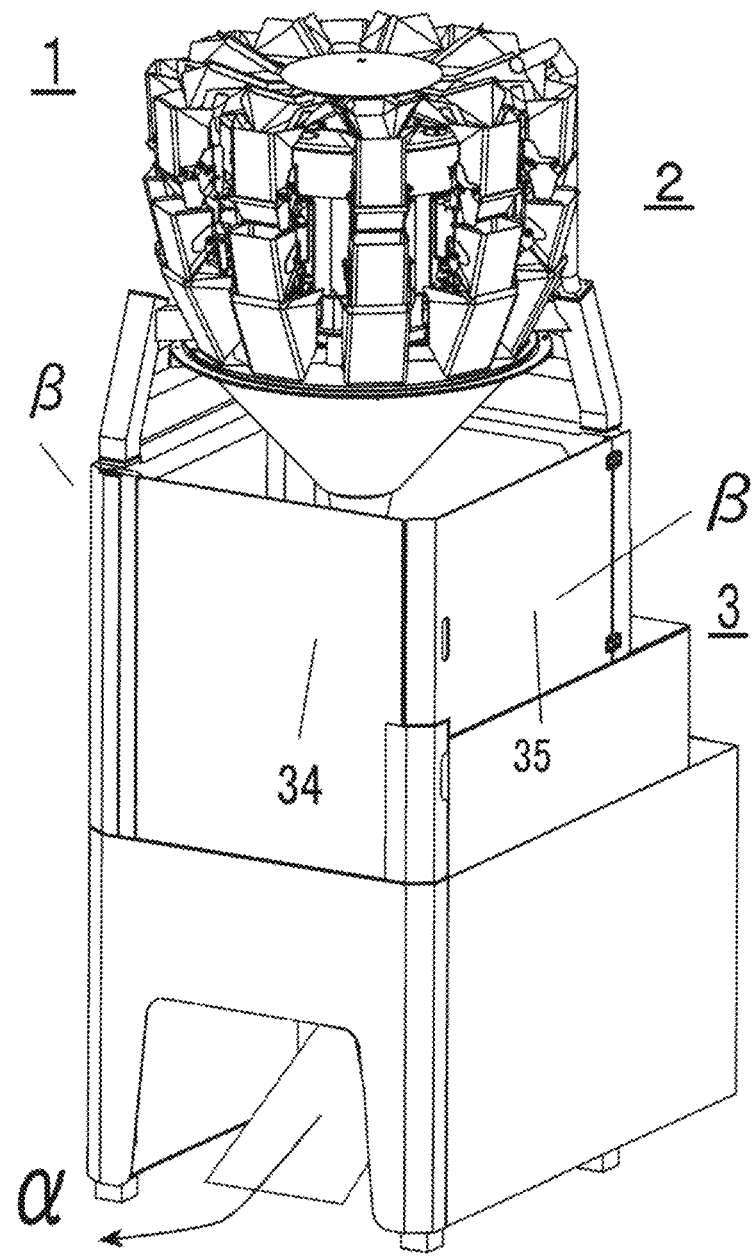
FIG. 1 is a perspective view of a weighing and packaging system according to an embodiment of the invention.

As illustrated in FIG. 1, a weighing and packaging system 1 includes a combination weighing apparatus 2 and a vertical type bag-making packaging apparatus (hereinafter referred to as a packaging apparatus) 3. The combination weighing apparatus 2 is directly loaded on the bag-making packaging apparatus 3.

The combination weighing apparatus 2 performs combination weighing on articles supplied from above, and discharges an article selected in the combination weighing to the packaging apparatus 3 disposed below. Details of the combination weighing apparatus 2 will be described below.

The packaging apparatus 3 forms a belt-shaped package (film) into a cylindrical shape to form a cylindrical package. The packaging apparatus 3 fills an inside of the cylindrical package with the article discharged from the combination weighing apparatus 2. The packaging apparatus 3 manufactures a bag by sealing the cylindrical package, and discharges the bag to an outside of the packaging apparatus 3. Details of the packaging apparatus 3 will be described below.

The bag manufactured by the packaging apparatus 3 is discharged in a direction indicated by a symbol α of FIG. 1. That is, α corresponds to a discharge direction of the bag.

In FIG. 1, a surface on a lateral side of the discharge direction α of the bag is indicated by β. In other words, two side surfaces β are present in a direction orthogonal to a vertical direction and the discharge direction α of the bag.

[Combination Weighing Apparatus 2]

Figure 2:
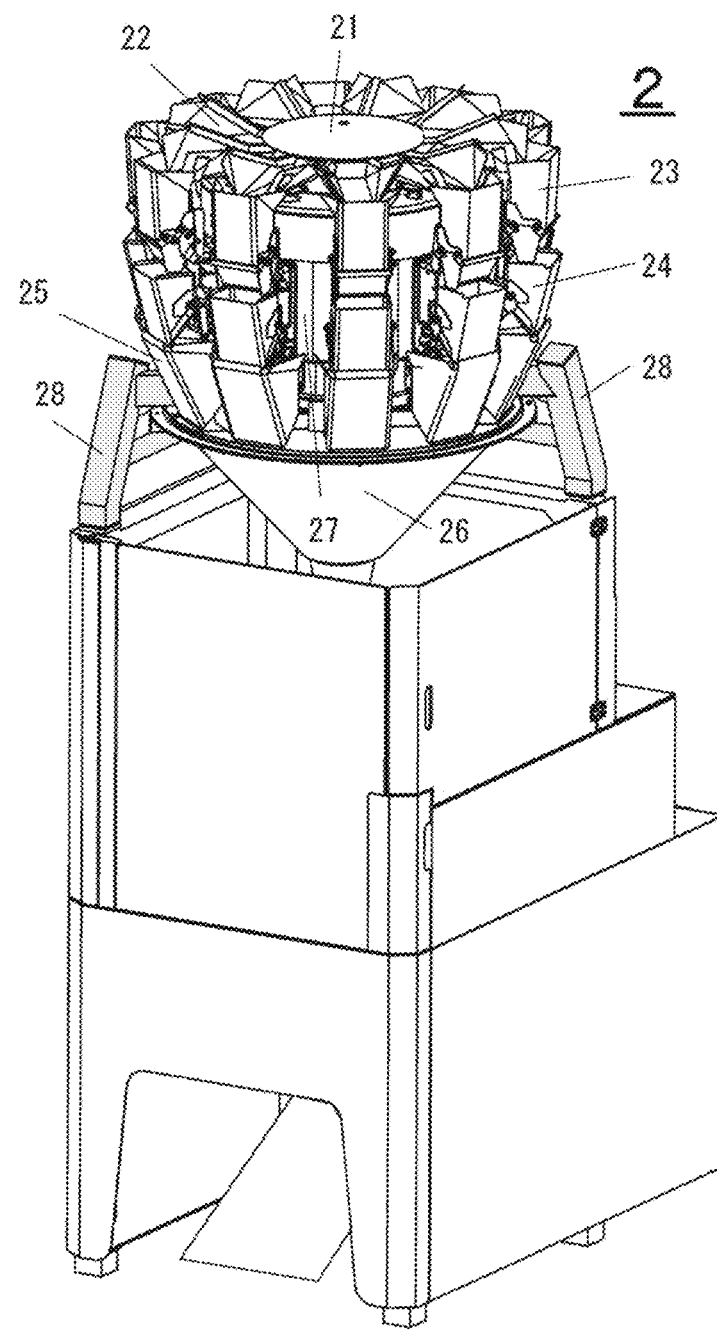
FIG. 2 is a perspective view of the weighing and packaging system of FIG. 1.
Figure 4:
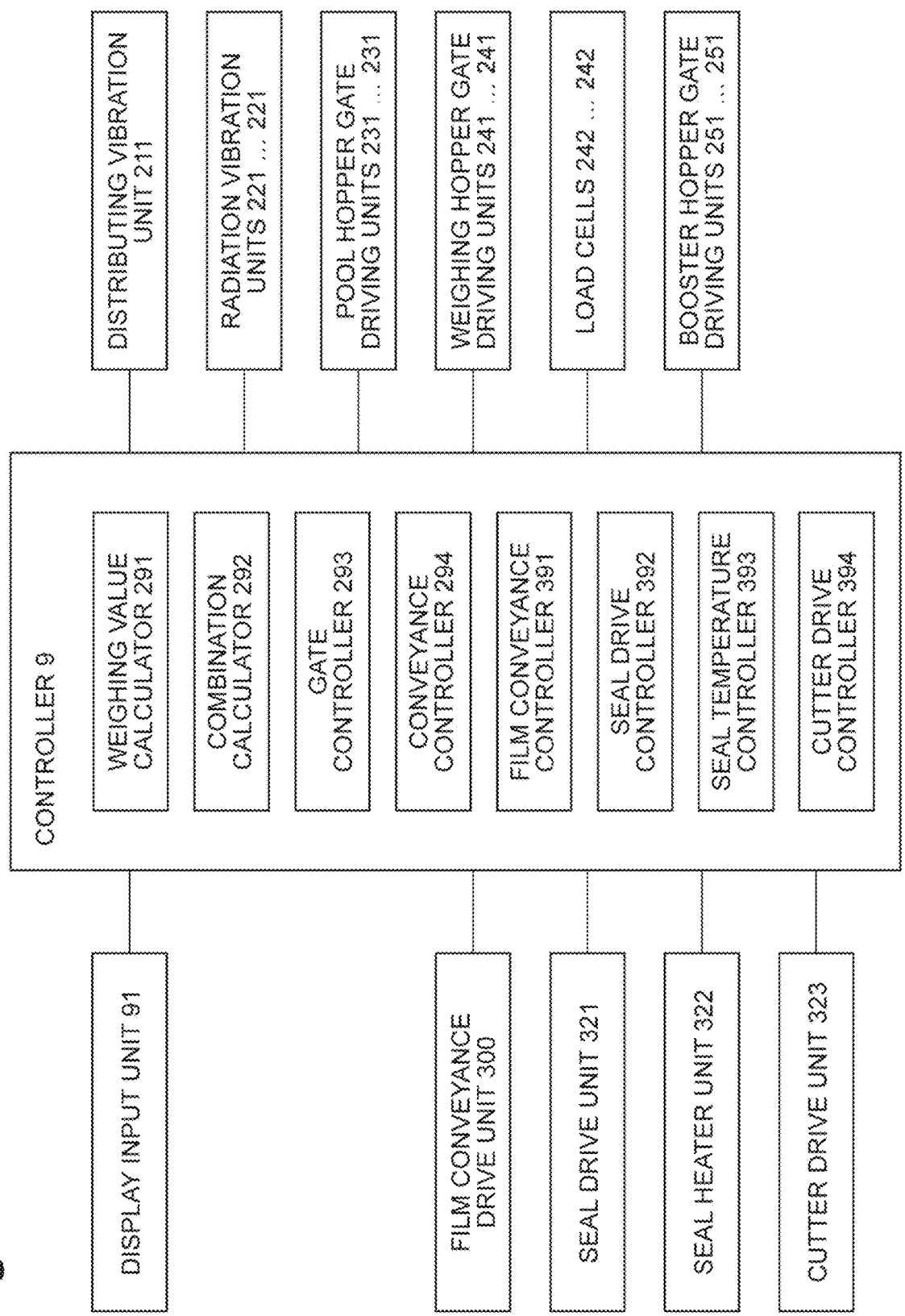
FIG. 4 is a function block diagram of the weighing and packaging system of FIG. 1.

As illustrated in FIG. 2 and FIG. 4, the combination weighing apparatus 2 includes a distributing unit 21, radiation units 22 radially disposed around the distributing unit 21, a plurality of pool hoppers 23 disposed below outer peripheral portions of the radiation units 22, a plurality of weighing hoppers (weighing units) 24 disposed below the pool hoppers 23, a plurality of booster hoppers (weighing units) 25 disposed below the weighing hoppers 24, and a collecting chute 26 disposed below the booster hoppers 25.

The combination weighing apparatus 2 further includes a main body frame 27 that supports the distributing unit 21, the radiation units 22 . . . 22, the pool hoppers 23 . . . 23, the weighing hoppers 24 . . . 24, and the booster hoppers 25 . . . 25, and a first support (weighing support) 28 that supports the main body frame 27.

Details of the first support 28 will be described below.

The distributing unit 21 has a conical distributing table and a distributing vibration unit 211 for vibrating the distributing table. In the distributing unit 21, articles are supplied to the distributing table from above. The distributing unit 21 distributes the articles around the distributing table to convey the articles by vibrating the distributing table.

The radiation unit 22 has a radiation trough and a radiation vibration unit 221 for vibrating the radiation trough. A plurality of radiation units 22 is disposed around the distributing unit 21. The articles distributed and conveyed by the distributing table are supplied to the radiation trough. The radiation trough conveys the articles by vibrating.

The pool hoppers 23 are disposed below the radiation units 22 on a downstream side in an article convey direction of the respective radiation units 22. Each of the pool hoppers 23 includes a pool hopper-side wall having an opening that opens in the vertical direction, a gate that closes or opens the opening on a lower side of the pool hopper-side wall, and a pool hopper gate driving unit 231 that opens or closes the gate. The pool hopper 23 temporarily accumulates articles conveyed from the radiation trough. The pool hopper 23 discharges articles to the weighing hopper 24 described below by opening the gate.

The weighing hoppers 24 are disposed below the pool hoppers 23 for the respective pool hoppers 23. Each of the weighing hoppers 24 includes a weighing hopper-side wall having an opening that opens in the vertical direction, a gate that closes or opens the opening on a lower side of the weighing hopper-side wall, a weighing hopper gate driving unit 241 that opens or closes the gate, and a load cell 242 connected to the weighing hopper-side wall. The weighing hopper 24 accumulates articles discharged from the pool hopper 23. The load cell 242 weights the articles accumulated in the weighing hopper 24.

The booster hoppers 25 are disposed below the weighing hoppers 24 for the respective weighing hoppers 24. Each of the booster hoppers 25 includes a booster hopper-side wall having an opening that opens in the vertical direction, a gate that closes or opens the opening on a lower side of the booster hopper-side wall, and a booster hopper gate driving unit 251 that opens or closes the gate. The booster hopper 25 accumulates articles weighed and discharged by the weighing hopper 24. The booster hopper 25 participates in combination calculation.

The collecting chute 26 has an inverted conical shape. The collecting chute 26 is disposed below the weighing hoppers 24 . . . 24 and the booster hoppers 25 . . . 25. The collecting chute 26 collects articles discharged from weighing hoppers 24 . . . 24 and booster hoppers 25 . . . 25 selected by a combination calculator 292 of a controller 9 described below, and discharges the articles from a discharge port on a lower side.

As illustrated in FIG. 4, the controller 9 includes a weighing value calculator 291, the combination calculator 292, a gate controller 293, and a conveyance controller 294. A configuration of the packaging apparatus 3 will be described below.

The weighing value calculator 291 calculates weight values of articles weighed by respective load cells 242 . . . 242 as weighing values of the respective weighing hoppers 24.

The combination calculator 292 combines weighing values of the respective weighing hoppers 24 and the respective booster hoppers 25 calculated by the weighing value calculator 291 and selects a combination of the weighing hoppers 24 and/or the booster hoppers 25 close to (corresponding to) a target weight value.

The gate controller 293 drives pool hopper gate driving units 231 . . . 231, weighing hopper gate driving units 241 . . . 241, and booster hopper gate driving units 251 . . . 251 to discharge articles in the pool hoppers 23 . . . 23, the weighing hoppers 24 . . . 24, and the booster hoppers 25 . . . 25. Specifically, the gate controller 293 drives a gate of a weighing hopper 24 and/or a booster hopper 25 selected by the combination calculator 292 to discharge an article in the weighing hopper 24 and/or the booster hopper 25. Thereafter, the gate controller 293 drives a gate of a pool hopper 23 or a weighing hopper 24 disposed above the empty weighing hopper 24 or booster hopper 25 to discharge an article in the pool hopper 23 or the weighing hopper 24 to the hopper on a lower side.

In addition, a touch panel serving as a display input unit 91 is connected to the controller 9 to allow display of various information or input of setting.

It is possible to obtain a product having a weight close to a target weight using the combination weighing apparatus 2 configured as described below.

[Packaging Apparatus 3]

Figure 3:
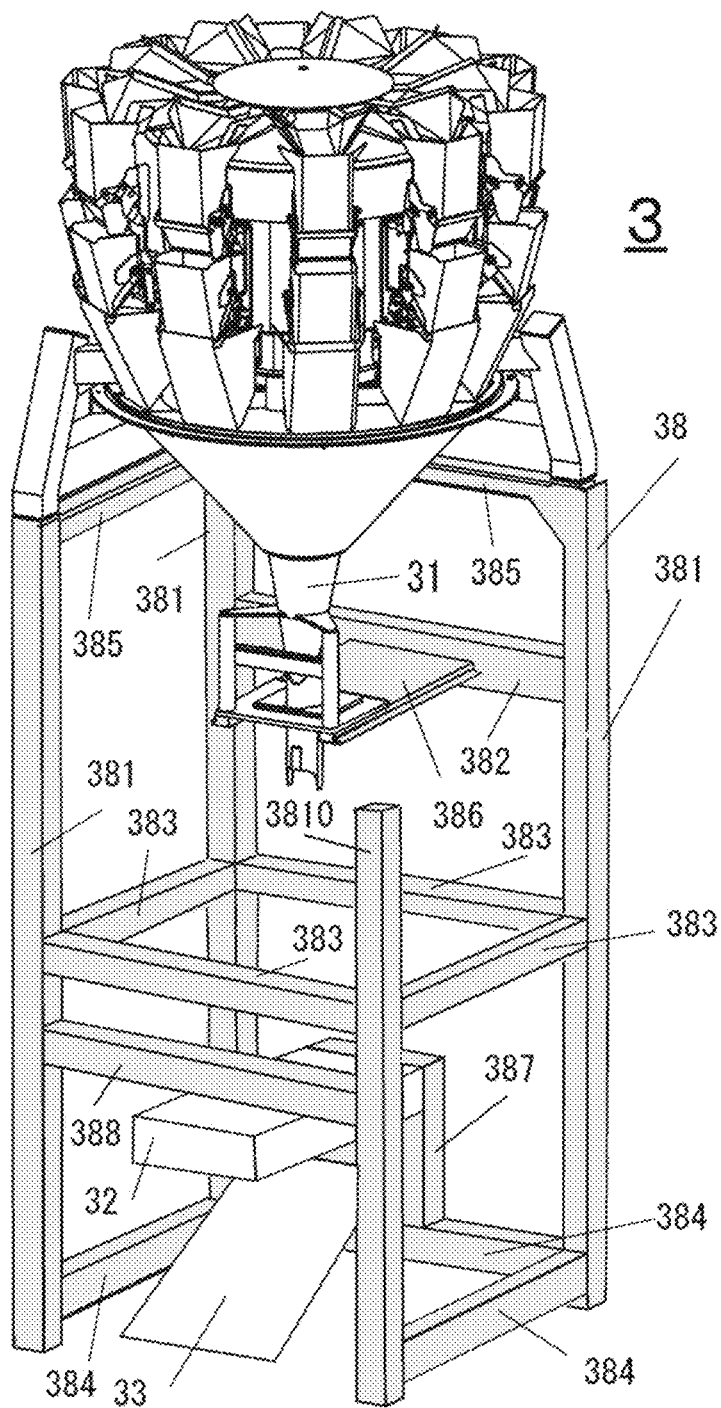
FIG. 3 is an explanatory view of a support of a packaging apparatus of the weighing and packaging system of FIG. 1.

As illustrated in FIG. 1, FIG. 3, and FIG. 4, the packaging apparatus 3 includes a former 31, a horizontal seal portion 32 disposed below the former 31, a bag discharge portion 33 disposed below the horizontal seal portion 32, a vertical seal portion, a film supply portion, and a cutter portion (not illustrated).

A conveyor for conveying a bag is present on the downstream side of the bag discharge portion 33 in the discharge direction α. For this reason, an operation space is narrow.

The packaging apparatus 3 further includes a front door 34, which can be opened or closed, disposed on the discharge direction α side, and a side door 35, which can be opened or closed, disposed on each of the two side surfaces β. The packaging apparatus 3 may further include a rear door, which can be opened or closed, disposed on a rear side opposite to the discharge direction α.

The packaging apparatus 3 further includes a second support (packaging support) 38 that supports the former 31, the horizontal seal portion 32, the bag discharge portion 33, the vertical seal portion, the film supply portion, and the cutter portion.

Details of the second support 38 will be described below.

The former 31 has an inverted conical upper cylinder and a cylindrical lower cylinder extending under the upper cylinder. An inside of the former 31 receives and passes the articles discharged from the combination weighing apparatus 2 on the upper side. An outside of the former 31 forms a film (package) supplied from the film supply portion into a cylindrical shape. The former 31 further has a vertical seal portion. The former 31 heat-seals a vertical portion of the package formed in the cylindrical shape using the vertical seal portion.

The horizontal seal portion 32 is disposed below the former 31. The horizontal seal portion 32 forms a sealed bag by heat-sealing an upper portion and a lower portion of a cylindrical film storing an article therein in a lateral direction.

The cutter portion is incorporated in the horizontal seal portion 32. The cutter portion drops the bag onto the bag discharge portion 33 by cutting a part sealed in the lateral direction using a cutter.

The bag discharge portion 33 is disposed below the horizontal seal portion 32, and discharges the bag dropped from the horizontal seal portion 32 to the outside of the packaging apparatus 3. The bag discharge portion 33 is made of a plate inclined downward.

The above-described controller 9 further includes a film conveyance controller 391, a seal drive controller 392, a seal temperature controller 393, and a cutter drive controller 394.

The film conveyance controller 391 controls a film conveyance drive unit 300 to control conveyance of the film supplied from the film supply portion.

The seal drive controller 392 controls a seal drive unit 321 to control driving of the seal portions of the vertical seal portion and the horizontal seal portion 32.

The seal temperature controller 393 controls a seal heater unit 322 to control a seal temperature of the seal portion of the vertical seal portion or the horizontal seal portion 32.

The cutter drive controller 394 controls a cutter drive unit 323 to control driving of the cutter of the cutter portion.

A bag filled with an article may be obtained using the packaging apparatus 3 configured as described above.

[Weighing Support]

The first support 28 will be described with reference to FIG. 5, FIG. 6, and FIG. 7.

The first support 28 has three first supporting legs 281, a horizontal beam 282, a horizontal beam 283, a horizontal beam 284, and two horizontal beams 285. The first supporting legs 281 are provided along vertical oblique directions. In other words, the first supporting legs 281 are disposed to be inclined with respect to the vertical direction. That is, the first supporting legs 281 are disposed along the vertical direction. The first supporting legs 281 may be disposed parallel to the vertical direction.

Figure 5:
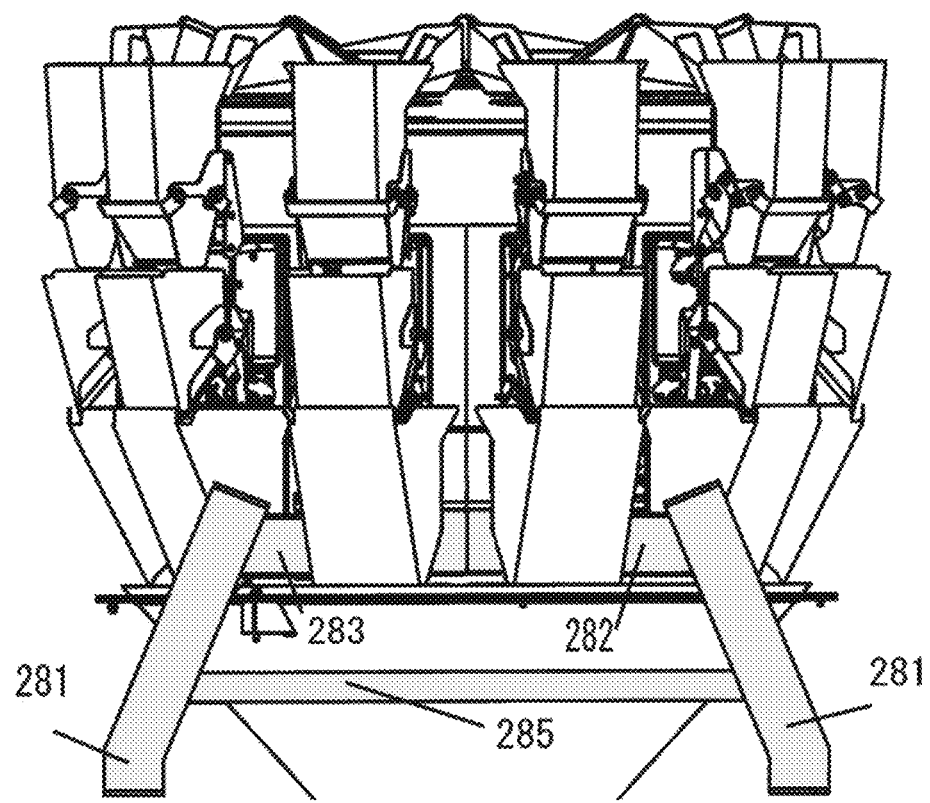
FIG. 5 is a side view of a support of a weighing apparatus of the weighing and packaging system of FIG. 1.

FIG. 5 is a diagram of the weighing and packaging system 1 viewed from a side. FIG. 6 is a diagram of the combination weighing apparatus 2 viewed from a bottom surface side. FIG. 7 is a side view of a cross section taken along A-A line of FIG. 6.

When a rectangular (square) region is imaginarily set to surround the combination weighing apparatus 2 in a planar view (viewed from above), four vertexes of the region are set to corners. The first supporting legs 281 are disposed at three corners among four corners. That is, as illustrated in FIG. 2, the first supporting legs 281 are not disposed at one of the four corners (in this example, a front right side in FIG. 2).

Figure 6:
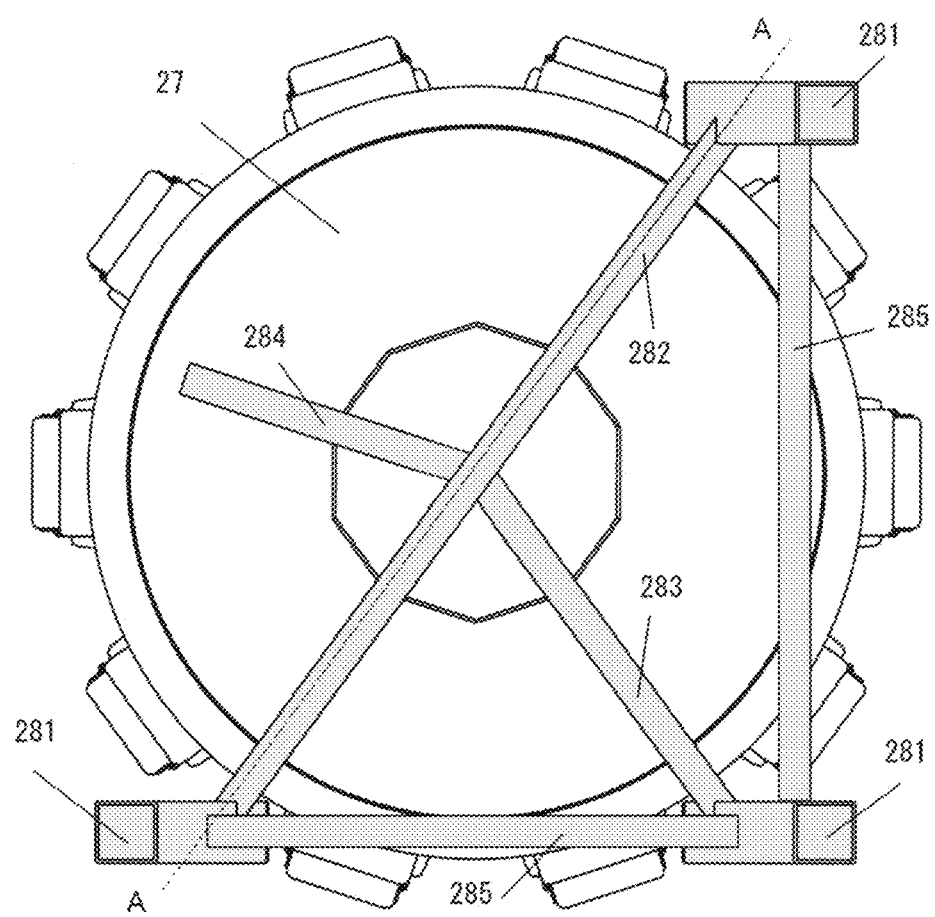
FIG. 6 is a bottom view of the support of the weighing apparatus.

As illustrated in FIG. 6, one horizontal beam 282 is disposed in a part having a longest distance between the first supporting legs 281 to connect two first supporting legs 281 to each other. In other words, the horizontal beam 282 connects two first supporting legs 281 disposed at two diagonally positioned corners to each other. The horizontal beam 282 is disposed above the first supporting legs 281 along the horizontal direction. The main body frame 27 is stacked and fixed on the horizontal beam 282.

Figure 7:
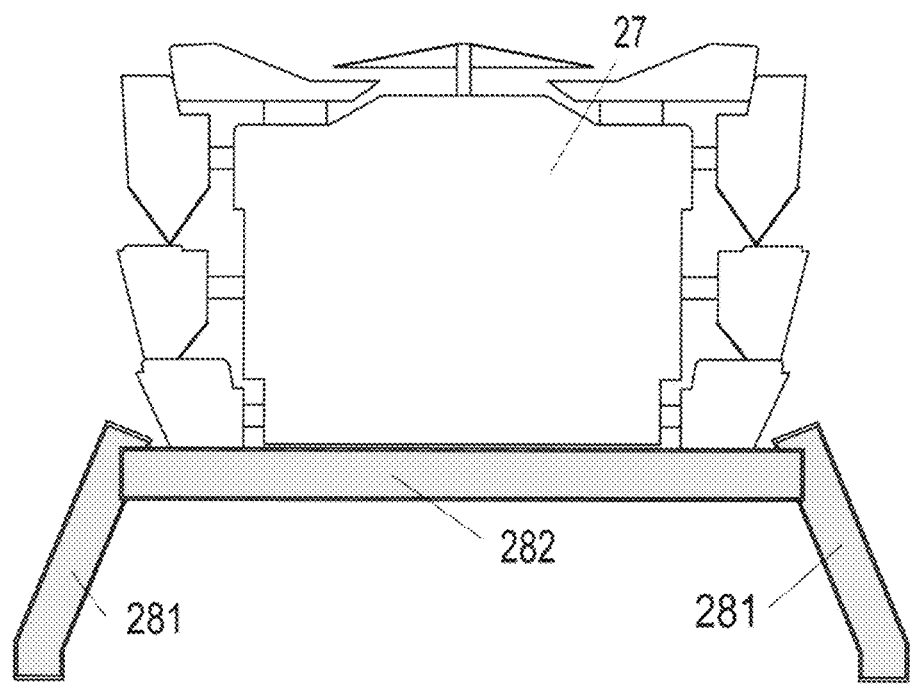
FIG. 7 is a cross-sectional view of the support of the weighing apparatus.

As illustrated in FIG. 7, the horizontal beam 282 supports a bottom surface of the main body frame 27. In this way, the horizontal beam 282 supports all the distributing unit 21, the radiation units 22, the pool hoppers 23, the weighing hoppers 24, the booster hoppers 25, and the load cell 242 supported by the main body frame 27.

The horizontal beam 282 includes one member. For this reason, rigidity of the horizontal beam 282 is high. In this way, the main body frame 27 is inhibited from vibrating in the vertical direction.

As illustrated in FIG. 6, the horizontal beam 283 connects the first supporting leg 281 (the first supporting leg 281 not connected by the horizontal beam 282) and the horizontal beam 282 to each other. The horizontal beam 283 is disposed on the bottom surface of the main body frame 27 along the horizontal direction. The horizontal beam 283 is disposed to intersect the horizontal beam 282. The horizontal beam 283 may be connected to a middle point of the horizontal beam 282 in an extending direction.

As illustrated in FIG. 6, the horizontal beam 284 is connected to the horizontal beam 282 and is disposed on the bottom surface of the main body frame 27 along the horizontal direction. The horizontal beam 284 is disposed to intersect the horizontal beam 282. The horizontal beam 284 may be connected to the middle point of the horizontal beam 282 in the extending direction.

A plane is configured by the horizontal beam 282, the horizontal beam 283, and the horizontal beam 284. Rigidity for preventing the combination weighing apparatus 2 from vibrating in the vertical direction is ensured by supporting the whole bottom surface of the main body frame 27 using the plane.

The horizontal beams 285 are disposed in parts in which intervals between the first supporting legs 281 are shortest on an outer circumferential side of the combination weighing apparatus 2. Each of the horizontal beams 285 is disposed along the horizontal direction and connects the first supporting legs 281 to each other. In other words, the horizontal beam 285 connects two first supporting legs 281 disposed at two adjacent corners to each other. The two horizontal beams 285 are orthogonal to each other. A triangle is formed by the horizontal beam 282 and the two horizontal beams 285 in the planar view. Two triangles are formed by the horizontal beam 283 dividing the triangle. In this way, extremely high rigidity is ensured with respect to horizontal vibration and vertical vibration of the combination weighing apparatus 2.

The first supporting legs 281 and the horizontal beams 285 are not disposed at one of the four corners. For this reason, there is no structure that may interfere with work on lateral sides of the collecting chute 26, that is, on a front side (the discharge direction α side) and one lateral side (a right side in FIG. 2). For this reason, a wide space is present when the collecting chute 26 is removed at the time of cleaning. As a result, the collecting chute 26 is easily removed, and workability is improved.

[Packaging Support]

The second support 38 will be described with reference to FIG. 3. FIG. 3 illustrates a state in which the front door 34, the side door 35, etc. are removed.

The second support 38 has three second supporting legs 381 and one second supporting leg 3810 shorter than the second supporting legs 381 in a height direction (vertical direction). The second supporting legs 381 and 3810 are provided along the vertical direction. In this example, the second supporting legs 381 and 3810 are disposed parallel to the vertical direction. The second supporting legs 381 and 3810 may be disposed to be inclined with respect to the vertical direction. The second supporting legs 381 are disposed at three of four corners of the packaging apparatus 3. The second supporting leg 3810 is disposed at a corner at which the above-described first supporting legs 281 are not disposed. The second supporting leg 3810 is disposed below the former 31.

The second support 38 further has a horizontal beam 382, four horizontal beams 383, three horizontal beams 384, two horizontal beams 385, one horizontal beam 388, a former supporting plate 386, and a horizontal seal portion support 387.

The second supporting legs 381 directly comes into contact with an installation floor surface, and are disposed immediately below the first supporting legs 281. The second supporting legs 381 support the first supporting legs 281. For this reason, an installation space rarely becomes larger even when the combination weighing apparatus 2 is directly loaded on the bag-making packaging apparatus 3. In addition, the combination weighing apparatus 2 is strongly supported.

The horizontal beam 382 connects the second supporting legs 381 disposed at two corners on a rear side in an opposite direction to the discharge direction α. The horizontal beam 382 is disposed along the horizontal direction on a rear side of a mounting position of the former 31. The former supporting plate 386 is fixed to the horizontal beam 382. The former supporting plate 386 supports a lower portion of the former 31.

As illustrated in FIG. 3, the horizontal beam 382 is not disposed on a front surface in the discharge direction α and a side surface on which the second supporting leg 3810 is disposed. In this way, no obstructive structure is present on the front side and one lateral side of the former 31. For this reason, a wide space is present on the front side and the one lateral side when the former 31 is removed. As a result, the former 31 is easily removed, and workability is improved.

The horizontal beams 383 are disposed along the horizontal direction on all surfaces of the front surface, the rear surface, and the side surfaces of the packaging apparatus 3. Two horizontal beams 383 connect the second supporting legs 381 to each other. The other two horizontal beams 383 connect the second supporting legs 381 and the second supporting leg 3810 to each other. The horizontal beams 383 are disposed below the former 31.

For this reason, a wide space is present around (on lateral sides of) the former 31 when the former 31 is removed. Thus, the former 31 is easily removed, and workability is improved.

The horizontal beams 384 are disposed along the horizontal direction on surfaces other than the front surface of the bag in the discharge direction α. The horizontal beams 384 connect the second supporting legs 381 to each other or the second supporting leg 381 and the second supporting leg 3810 to each other. The horizontal beams 384 are disposed below the former 31. Specifically, the horizontal beams 384 are disposed at a lowermost part of the packaging apparatus 3.

For this reason, a wide space is present around the former 31 when the former 31 is removed. Thus, the former 31 is easily removed, and workability is improved.

The horizontal beams 385 are disposed along the horizontal direction at an uppermost part of the packaging apparatus 3. The horizontal beams 385 are disposed on a rear side and the other lateral side (a left side in FIG. 3) of the collecting chute 26. The horizontal beams 385 connect the second supporting legs 381 to each other, and are not connected to the second supporting leg 3810. Further, the horizontal beams 385 are disposed on the same side surface and rear surface as those of the horizontal beams 285 of the combination weighing apparatus 2 described above. In other words, there is no structure interfering with work on the front side and one lateral side of the collecting chute 26 similarly to the horizontal beams 285 of the combination weighing apparatus 2 described above. For this reason, a wide space is present on the front side and the one lateral side when the collecting chute 26 is removed at the time of cleaning. As a result, the collecting chute 26 is easily removed, and workability is improved.

The horizontal beam 388 is disposed below the horizontal beam 383 on the front surface of the packaging apparatus 3 and along the horizontal direction. The horizontal beam 388 connects the second supporting leg 381 and the second supporting leg 3810 to each other.

For this reason, a wide space is present around the former 31 when the former 31 is removed. As a result, the former 31 is easily removed, and workability is improved.

The horizontal seal portion support 387 is connected to the horizontal beam 384 on the rear surface and the horizontal seal portion 32. The horizontal seal portion support 387 supports the horizontal seal portion 32.

In this way, the second support 38 configures a structure as a rectangular parallelepiped having high rigidity by the second supporting legs 381 and the second supporting leg 3810 provided along the vertical direction and the horizontal beam 382, the horizontal beams 383, the horizontal beams 384, the horizontal beams 385, and the horizontal beam 388 provided along the horizontal direction. For this reason, high rigidity is ensured with respect to the horizontal direction and the vertical direction.

[Opening]

Figure 8:
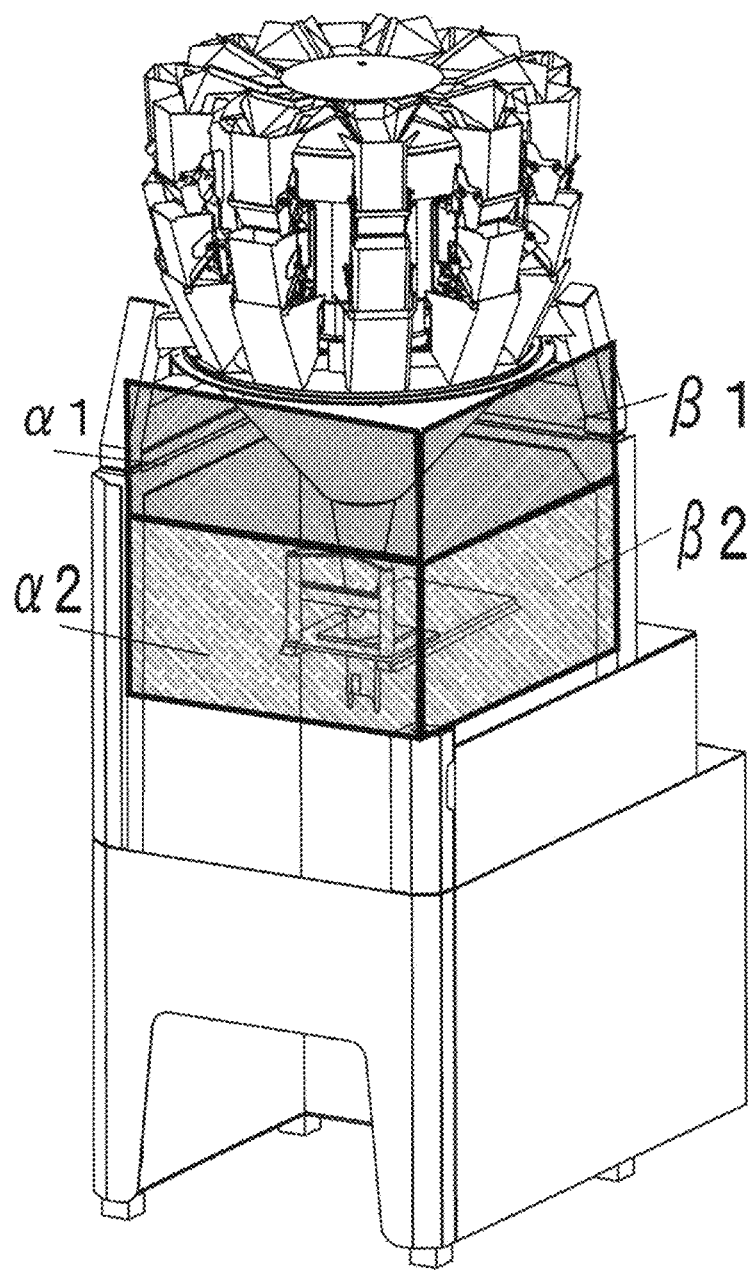
FIG. 8 is an explanatory view of an opening of the weighing and packaging system of FIG. 1.

As described above, the first supporting legs 281 are not disposed at corners on the right side and the near side in FIG. 8, and the second supporting leg 3810 having a low height is disposed.

In addition, the horizontal beams 285 of the combination weighing apparatus 2 and the horizontal beam 382, the horizontal beams 383, the horizontal beams 384, the horizontal beams 385, and the horizontal beam 388 of the packaging apparatus 3 are not disposed on the front side and the one lateral side of the collecting chute 26 and the former 31.

In this way, a second upper opening α1 and a first upper opening β1 are formed on the front side and one lateral side of the collecting chute 26. The second upper opening α1 opens to the discharge direction α, and exposes the discharge direction α side of the collecting chute 26. The first upper opening β1 opens to one lateral side, and exposes the one lateral side of the collecting chute 26.

Further, a second lower opening α2 and a first lower opening β2 are formed on the front side and one lateral side of the former 31. The second lower opening α2 opens to the discharge direction α, and exposes the discharge direction α side of the former 31. The first lower opening β2 opens to one lateral side, and exposes the one lateral side of the former 31. In other words, the horizontal beams 285 of the combination weighing apparatus 2 and the horizontal beam 382, the horizontal beams 383, the horizontal beams 384, the horizontal beams 385, and the horizontal beam 388 of the packaging apparatus 3 are not disposed in the second openings α1 and α2 and the first openings β1 and β2. In other words, the horizontal beams 285 of the combination weighing apparatus 2 and the horizontal beam 382, the horizontal beams 383, the horizontal beams 384, the horizontal beams 385, and the horizontal beam 388 of the packaging apparatus 3 are disposed such that the second openings α1 and α2 and the first openings β1 and β2 are formed.

The second upper opening α1 and the second lower opening α2 are continuous with each other and the first upper opening β1 and the first lower opening β2 are continuous with each other in a longitudinal direction (vertical direction). For this reason, large openings are formed. In more detail, the first openings β1 and β2 laterally continuous from the collecting chute 26 to the former 31 are provided on one of side surfaces with respect to the discharge direction α of the bag of the weighing and packaging system 1. In addition, the second openings α1 and α2 laterally continuous from the collecting chute 26 to the former 31 are provided on the surface in the discharge direction α of the bag of the weighing and packaging system 1.

In this way, the opening may be easily larger than each of the collecting chute 26 or the former 31. Accordingly, when the collecting chute 26 or the former 31 is removed, an operation of removing the collecting chute 26 or the former 31 may be easy.

Because the first openings β1 and β2 are formed on the lateral side in the discharge direction α, an operation may be performed in a large space without being interfered by the conveyor that conveys the bag. For this reason, efficiency of a removal operation is improved.

The second upper opening α1 and the first upper opening β1 are continuous with each other and the second lower opening α2 and the first lower opening β2 are continuous with each other in the lateral direction (a direction intersecting the vertical direction). That is, the second upper opening α1 and the first upper opening β1, and the second lower opening α2 and the first lower opening β2 are adjacent to each other to form continuous openings. For this reason, large openings are formed in the lateral direction. In this way, the operation of removing the collecting chute 26 or the former 31 becomes easy.

The front side or one lateral side may be selected as a removing direction of the collecting chute 26 or the former 31 depending on the circumstances. In addition, removal is allowed in a direction between the second upper opening α1 and the first upper opening β1 and between the second lower opening α2 and the first lower opening β2, and removal is allowed from three or more directions.

In the weighing and packaging system 1, large openings are formed by providing continuous openings on two of the front surface, the rear surface, and the side surfaces in four directions, which is implemented by unevenly arranging the supporting legs and setting a widest interval in the removing direction of the components.

According to the weighing and packaging system 1, the first opening that opens to the lateral side in the discharge direction of the bag and exposes the collecting chute and the former on the lateral side, is provided. For this reason, an opening having a size equal to or larger than that of a component to be removed is formed. Therefore, a removal operation in a space having a margin is allowed. For this reason, efficiency of the removal operation is improved.

In addition, in the weighing and packaging system 1, the first opening is present on the lateral side in the discharge direction of the bag. Because the weighing and packaging system 1 includes the first opening that opens to a direction in which a structure such as a discharge conveyor is not present, a removal operation in a wide space is allowed, and efficiency of the removal operation is improved.

Modified Example A

In the above embodiment, the combination weighing apparatus having circular arrangement has been described. However, a combination weighing apparatus having so-called linear arrangement may be provided.

Modified Example B

In the above embodiment, the description has been given of the vertical type bag-making packaging apparatus. However, it is possible to employ a packaging apparatus including a former or an article input unit. The packaging apparatus may correspond to a bag packaging apparatus.

Modified Example C

In the above embodiment, the openings are provided on the front surface and the one side surface. However, the opening may not be provided on the front surface, and the opening may be provided only on the one side surface. In this case, an operation in a wide space is allowed without being interfered by the conveyor that conveys the bag, and thus efficiency of the removal operation is improved.

Modified Example D

In the above embodiment, the first supporting legs and the second supporting leg are unevenly disposed at three of the four corners. However, the supporting legs may be equally allocated at 120 degree intervals. In more detail, when a triangular (regular triangular) region is imaginarily set to surround the combination weighing apparatus 2 in the planar view, and three vertexes of the region are set to corners, the first supporting legs and the second supporting leg may be disposed at the three respective corners. It is essential to provide an opening that opens to the lateral side in the discharge direction of the bag and exposes the collecting chute and the corner on the lateral side.

For example, in a case of a combination weighing machine having a U-shaped electric case in a planar view which opens only to one of side surfaces, the electric case may be disposed such that an opening opens to a lateral side in a discharge direction. In this case, the former may be removed to a side of the vertical type bag-making packaging apparatus.

Modified Example E

In the above embodiment, the three first supporting legs of the weighing apparatus and the three long second sup-porting legs of the packaging apparatus are provided. However, the invention is not restricted thereto, and one first supporting leg of the weighing apparatus and one second supporting leg of the packaging apparatus or two first supporting legs of the weighing apparatus and two second supporting legs of the packaging apparatus may be provided. In this case, main components of the respective devices are supported by a cantilever beam structure. Four or more first supporting legs of the weighing apparatus and four or more second supporting legs of the packaging apparatus may be provided. In this case, an opening for removing the collecting chute or the former may be provided.

REFERENCE SIGNS LIST

1 . . . weighing and packaging system, 2 . . . combination weighing apparatus, 3 . . . packaging apparatus, 28 . . . first support, 38 . . . second support.

The invention claimed is:

1. A weighing and packaging system comprising:
a combination weighing apparatus including a plurality of weighing units that accumulates and weighs supplied articles, a combination calculator that performs combination calculation using weighing values weighed by the weighing units and selects a combination of corresponding articles, and a collecting chute that collects and discharges the articles pertaining to the combination;
a packaging apparatus including a former that receives the articles discharged from the combination weighing apparatus disposed on an upper side and forms a belt-shaped package into a cylindrical shape such that the articles fill an inside thereof, a seal portion disposed below the former to seal the cylindrical package, thereby forming a bag, and a discharge portion that discharge the bag formed by the seal portion;
a main body frame supporting the weighing units;
a plurality of first supporting legs disposed along a vertical direction to support the main body frame;
a plurality of second supporting legs disposed along the vertical direction to support the former; and
a plurality of horizontal beams connecting the plurality of first supporting legs to each other,
wherein a first opening that opens to a lateral side of a discharge direction of the bag and exposes the collecting chute and the former on the lateral side is provided, and
wherein the horizontal beams are not disposed in the first opening, and one of the horizontal beams connects two first supporting legs disposed at two diagonally positioned corners to each other.

2. The weighing and packaging system according to claim 1, wherein a second opening that opens to the discharge direction and exposes the collecting chute and the former on a discharge direction side is further provided.

3. The weighing and packaging system according to claim 2, wherein the first opening and the second opening are continuous with each other.

4. The weighing and packaging system according claim 1, further comprising:
a plurality of other horizontal beams connecting the plurality of second supporting legs to each other, wherein the other horizontal beams are not disposed in the first opening.

5. The weighing and packaging system according to claim 4, wherein the respective first supporting legs are supported by the second supporting legs.

* * * * *